United States Patent
Anderson

[11] Patent Number: 5,806,776
[45] Date of Patent: Sep. 15, 1998

[54] FLANGE CONTACT FRICTION BRAKE FOR A FISHING REEL

[76] Inventor: Carl E. Anderson, 1011 Capouse Ave., Scranton, Pa. 18509

[21] Appl. No.: 789,328

[22] Filed: Jan. 23, 1997

Related U.S. Application Data

[63] Continuation-in-part of Ser. No. 456,551, Jun. 1, 1995, abandoned.

[51] Int. Cl.⁶ .................................................. A01K 89/02
[52] U.S. Cl. ......................... 242/292; 242/294; 242/301; 242/310; 242/323; 242/396.8
[58] Field of Search .................................... 249/290, 291, 249/292, 294, 301, 309, 310, 323, 396.8

[56] References Cited

U.S. PATENT DOCUMENTS

| | | | |
|---|---|---|---|
| 620,388 | 2/1899 | Washburn | 242/294 |
| 1,064,816 | 6/1913 | Catucci | 242/291 X |
| 1,299,959 | 4/1919 | Keyser . | |
| 1,353,113 | 9/1920 | Deets | 242/291 |
| 1,353,816 | 9/1920 | Abbott, Jr. | 242/291 |
| 1,379,692 | 5/1921 | Pfleuger . | |
| 1,572,032 | 2/1926 | Page . | |
| 1,682,709 | 8/1928 | Pflueger | 242/291 X |
| 1,856,047 | 4/1932 | Adams . | |
| 2,170,186 | 8/1939 | Catron | 242/310 X |
| 2,535,584 | 12/1950 | Lorenz | 242/292 |
| 2,555,824 | 6/1951 | Stout . | |
| 2,662,700 | 12/1953 | Higgins . | |
| 2,692,093 | 10/1954 | Tengesdal | 242/291 X |
| 2,858,636 | 11/1958 | Stipe . | |
| 3,045,943 | 7/1962 | Forrester | 242/292 X |
| 3,467,336 | 9/1969 | Appleton . | |
| 4,964,590 | 10/1990 | Sato . | |

FOREIGN PATENT DOCUMENTS

| | | |
|---|---|---|
| 20591 | of 1901 | United Kingdom . |
| 3459 | of 1905 | United Kingdom . |
| 18691 | of 1906 | United Kingdom . |
| 5986 | of 1911 | United Kingdom . |
| 288101 | 4/1928 | United Kingdom . |

*Primary Examiner*—Donald P. Walsh
*Assistant Examiner*—Emmanuel M. Marcelo
*Attorney, Agent, or Firm*—Helfgott & Karas, P.C.

[57] ABSTRACT

A friction brake for a fishing reel comprises an arcuate strip of bendable plastic that is cantilevered from a fixed flange of a fishing reel and extends over and generally concentrically with a rotating flange of the reel. When braking action is required to stop or restrain the playing-out of fishing line, pressure on the free edge of the brake causes contact between a brake surface and the outer periphery of the rotating reel flange. The degree of braking depends upon the area of the brake that is brought into contact with the rotating reel flange by the fisherman and upon the magnitude of force applied by the fisherman's hand onto the brake. The brake attaches at its fixed edge to the non-moving portion of the reel by means of an adhesive layer. Alternative embodiments that contact the fishing line extend from fixed portions of the reel.

16 Claims, 4 Drawing Sheets

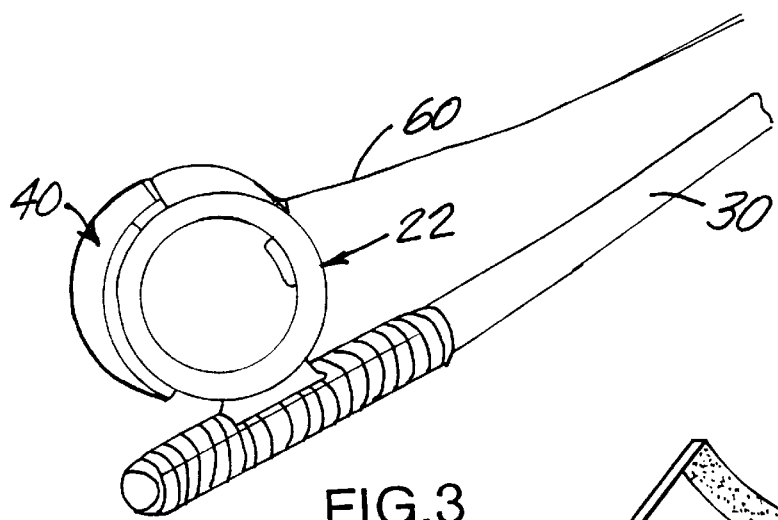
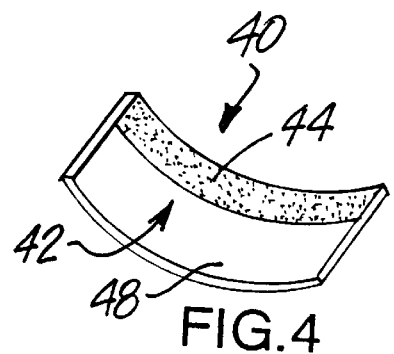
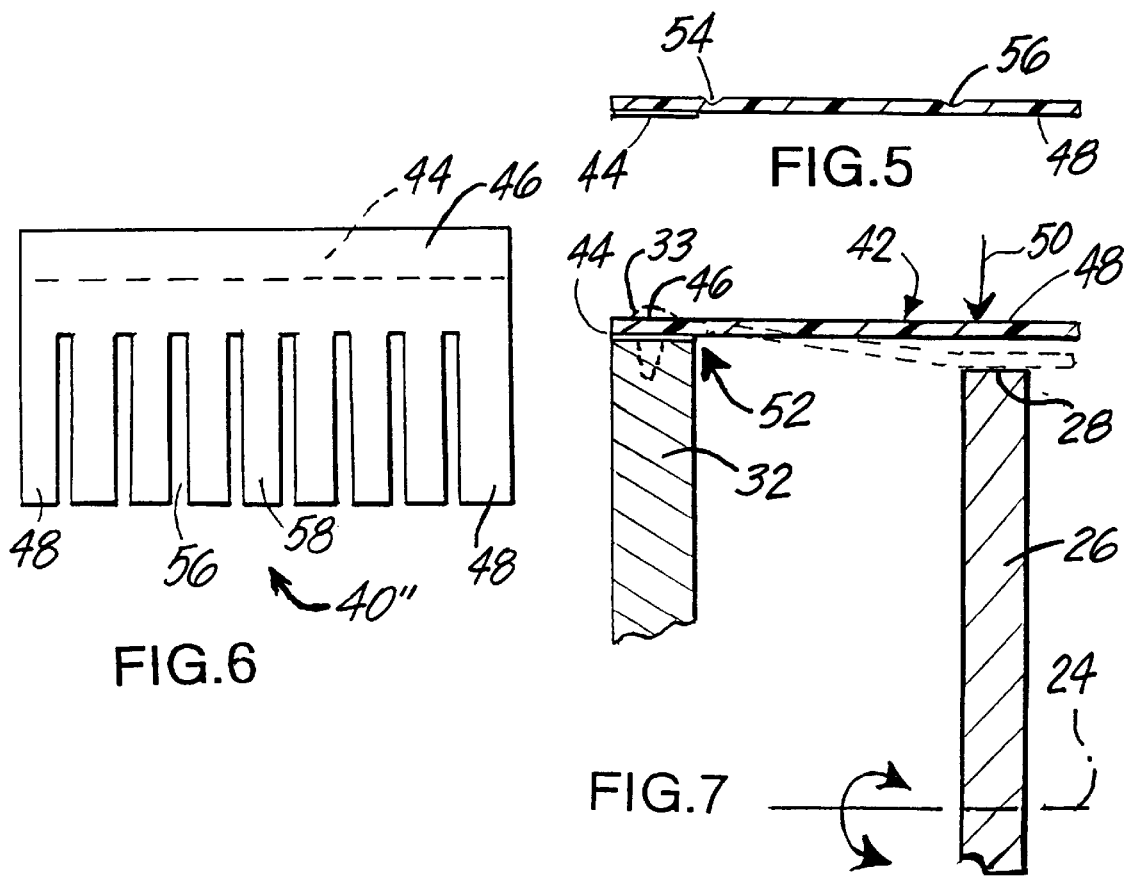

FLANGE CONTACT FRICTION BRAKE FOR A FISHING REEL

This application is a continuation-in-part of Ser. No. 08/456,551, filed Jun. 1, 1995, abandoned.

BACKGROUND OF THE INVENTION

This invention relates generally to friction brakes for fishing reels and more particularly to a friction brake that acts on the outer periphery of a rotating flange of the fishing reel.

The prior art of fishing reels includes many patents describing braking mechanisms for reels, some mechanisms being very simple and others being more complex. However, the reality of the situation is that no fishing reels are in actual general use that provide braking when the target is large game fish, such as tarpon. When a fish is hooked, the fish may run several hundred yards at a substantial speed, and the spinning part of the reel continuously rotates. After a time, the fisherman may use the palm of his hand against the rotating reel until playout of line is stopped or is allowed to continue at a desired rate. In so doing, the fisherman often burns his palm. For this reason, some professionals wear gloves to prevent such palm burns.

By their absence from everyday use, it may be deduced that the braking mechanisms of the prior art do not stand up under heavy loads as caused by large game fish, or do not provide the finesse in controlling the line that is provided by the human touch and feel on the moving reel.

What is needed is a brake mechanism for a fishing reel that is simple, trouble free and provides a degree of finesse and control of the fishing lines that closely approximates the performance achieved by direct contact of the human hand on the rotating reel.

Additionally, some of the prior art devices may have placed undue stress on the fixed elements of the reel during braking. For example, British patent 20,591, accepted Oct. 12, 1901, (FIGS. 1, 2) provide a cantilevered spring construction of a brake that was mounted by lugs or extensions to one fixed side of the reel. An arcuate free surface of the element engaged the moving flange of the reel when pressure was applied to a handle. As stated in the patent, the extended handle was necessary to provide high leverage, as the device was basically strong and rigid, made of material such as brass.

As will be apparent upon examination of the figures in that patent, the amount of bending of the device toward the moving edge of the reel was in inverse relationship to the distance from the handle to the moving reel flange. Thus, it can be expected that the device of FIG. 1 contacted the reel, e.g., at the point c in FIG. 2, but not along the entire arc of the brake. Thus, wear was concentrated at the point b on the brake device and excessive local heating would be expected.

Also, the braking surface of the device of FIG. 1 was cantilevered from the fixed side of the reel by attachment using the lugs 18. Accordingly, as the free edge of the brake device was pressed toward the rotating reel flange, the bending stresses induced in the cantilevered element were transmitted to the fixed portion of the reel through the lugs. This transmission of forces could be especially significant in that the lugs were not hinged to the remainder of the brake device. Therefore, the right angles between the lugs and the remainder (brake shoe) of the device would remain intact. In such a case, the forces of bending applied to the handle are transmitted to the bearings, which generally are not designed to take such twisting moments transverse to the rotating axis.

Thereby, in addition to local heating and wear where the brake is applied to the moving reel flange, the life of the reel bearings will be shortened by application of the brake.

SUMMARY OF THE INVENTION

It is an object of the invention to provide an improved friction brake for a fishing reel that is simple in construction, easy to apply to an existing reel and allows "finessing" of the brake in a manner similar to manual braking.

Another object of the invention is to provide an improved friction brake for a fishing reel that does not distort the reel structure or stress the reel bearings when braking is applied.

Still another object of the invention is to provide an improved friction brake for a fishing reel that spreads the braking load over extended surfaces thereby providing better control and better distribution of generated heat.

A friction brake for a fishing reel in accordance with the invention comprises an arcuate strip of bendable plastic that is cantilevered from a fixed flange of a fishing reel and extends over and generally concentrically with a rotating flange of the reel.

When braking action is required to stop or restrain the playing-out of fishing line caused by a run of a fish that has taken the hook, pressure on the free edge of the brake causes contact between a brake surface and the outer periphery of the rotating reel flange. The degree of braking depends upon the area of the brake that is brought into contact with the rotating reel flange and upon the magnitude of force applied by the fisherman's hand onto the brake. The size of the braking area is a variable under control of the fisherman. A plastic finger extends over the moving flange at one end of the arcuate strip in an embodiment that provides precision control by allowing both palm and single finger pressure to be applied concurrently to the reel.

The brake attaches at its fixed edge to the non-moving portion of the reel by means of an adhesive layer, which may be a double sided tape. Stresses induced in the brake when the brake is applied are not transmitted to the fixed members or bearings of the reel because of the adhesive connection, which would yield before the reel components deform, and as a result of the ability of the plastic brake to flex in a hinge-like manner and take on compound curvatures when a braking force is applied.

In a construction, where the moving reel element, having one or two rotating flanges, rotates between two fixed members, the arcuate plastic strip is supported at one longitudinal end on a rod that spans the space between the fixed members at a position radially out from the rotating flange rims. The other or free end of the plastic strip extends between the flanges where it may make direct contact with the fishing line in the reel as the line is played out. The fisherman applies variable levels of hand or finger pressure to the brake strip in playing the fish.

The fish line-contacting brake strip may also attach to the fixed members of the reel.

The invention accordingly comprises the features of construction, combinations of elements, and arrangements of parts, which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which:

FIG. 3 is a perspective view of a friction brake in accordance with the invention attached to a fishing reel and fishing pole;

FIG. 4 is a top perspective view of the friction brake of FIG. 3 in accordance with the invention;

FIG. 5 is an end view of an alternative embodiment of a friction brake for a fishing reel in accordance with the invention;

FIG. 6 is a top view of another alternative embodiment of a friction brake for a fishing reel in accordance with the invention;

FIG. 7 is a partial end view in section of the friction brake of FIG. 4 in accordance with the invention, attached to the fishing reel;

DESCRIPTION OF PREFERRED EMBODIMENTS

Figure 1:
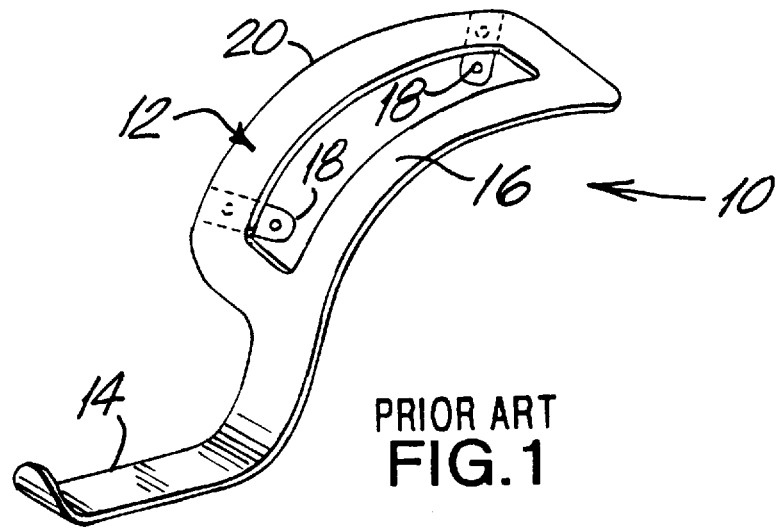
FIG. 1 is a perspective view of a cantilever type brake element for a fishing reel of the prior art.

Prior to describing the present invention, a friction brake of the prior art as presented in British patent 20,591, issued 1901, will be described with references to FIGS. 1 and 2. A friction brake 10 includes an arcuate segment 12 and a handle 14. The handle 14 joins to an arcuate edge portion 16 that serves as a brake shoe. A pair of lugs 18 extend radially and perpendicularly from the opposite arcuate edge 20 of the brake 10.

In use, the lugs 18 attach to a fixed member 32 (FIG. 8) of a reel 22 with the arcuate portion 12 substantially concentric with the rotating axis 24 of the reel 22. The free edge portion or brake shoe 16 is cantilevered by the lugs 18 over a rotating flange 26 of the reel.

When it is desired to apply a braking force to the outer periphery 28 of the rotating flange 26, pressure is applied to the handle 14 in a direction toward the pole 30 to which the reel 22 is mounted in a conventional manner. Then, the concave surface 27 of the brake shoe portion 16 rubs against the outer periphery 28 of the moving flange 26. By friction, a slow down or stoppage of the reel rotation is effected.

The friction brake 10 is made to act as a cantilever spring, as described, and may be made of such material as brass.

Figure 8:
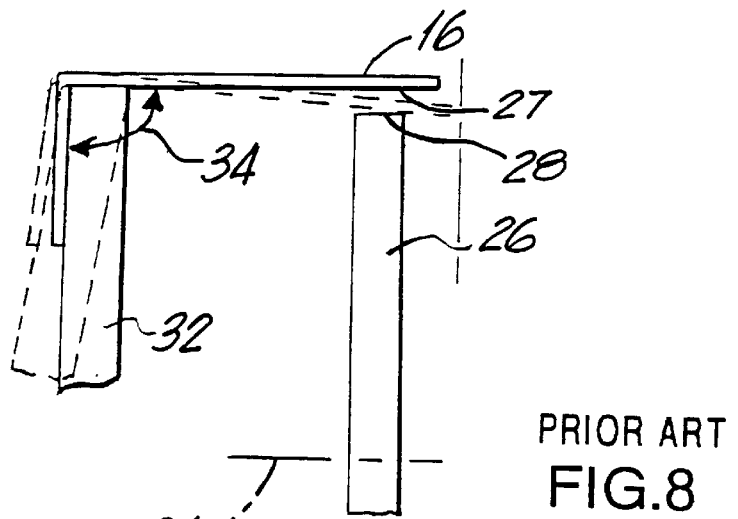
FIG. 8 is a view similar to FIG. 7 illustrating operation of the prior art friction brake of FIG. 1.

Being a spring, the friction brake 10 exerts a force on the fixed portion 32 (FIG. 8) of the reel 22. The right angle corner 34 tends to remain at a right angle as the free edge 16 is depressed, as indicated by the broken lines in FIG. 8. Thus, a stress exerted on the fixed part 32 tends to distort the fixed member 32. This member 32 in turn transmits its bending/stress to the bearings located between the shaft 36 and the rotating flange 26. The broken lines in FIG. 8 are an exaggeration indicating the tendency of the fixed member 32 to be displaced and distorted when the spring (brake) 10 is bent to cause braking.

A friction brake 40, in accordance with the invention, FIGS. 3–7 includes an arcuate segment 42. The friction brake 40 attaches to the fixed member 32 (FIG. 7) of a reel 22 by means of an adhesive layer 44 that is on the concave inner surface of the brake 40 along one arcuate edge 46. The adhesive layer 44 may comprise a layer of adhesive material or may be, e.g., a double-backed adhesive tape or foam layer. The adhesive 44 holds the inner edge 46 of the arcuate segment 42 to the fixed flange 32 of the reel 22 while the free edge 48 of the arcuate segment 42 extends over the outer periphery 28 of the rotating reel flange 26.

The same reference numerals have been used to describe similar elements of different embodiments.

The brake segment 42 may be fabricated, for example, of vinyl or polyethelene having a thickness, depending on the reel size, in an approximate range of 0.02 to 0.25 inches. Use of plastic avoids generation of particles and chips which create an annoyance and may injure the persons skin or damage the fishing line and reel mechanism.

To apply the brake 40 and stop or slow down rotation of the reel flange 26, a force indicated by the arrow 50 is applied to the outer or convex surface of the mounted arcuate segment 42. Thereby, the brake segment 42 is deflected, as indicated with the broken lines of FIG. 7, to contact the outer periphery 28 or rim of the rotating reel flange 26.

The force 50 can be applied anywhere along the circumferential arc of the segment 42, and anywhere between the fixed flange member 32 and the free edge 48 of the brake 40. Because the plastic material is thin and readily deformed there is hinge-like bending at the intersection 52 between the hinge 40 and the fixed member 32 of the reel. The small forces required for bending the plastic are taken up by the adhesive layer 44 and the fixed reel member 32 is not stressed or distorted.

Additionally, flexibility of the plastic allows for an extended area of contact between the outer periphery 28 of the moving flange 26 as compared to the linear or edge contact (FIG. 8) when a spring, such as described in the prior art, is pressed downward. The required force increases as deflection of the spring increases. Thus, forces tending to distort the reel structure in the prior art may be substantial when large braking forces are required.

Also, if, for the sake of discussion the fisherman should press on the outer edge portion 16 of the brake 10 (FIGS. 1, 2) with his palm, as is the mode in the present invention, then a line contact between the outer periphery 28 of the moving flange 26 and the brake edge portion 16 is formed. This in a metal element will cause considerable local wear on the brake element as well as on the rotating periphery 28 of the reel 22. Chips and particles may be generated. Because the metal is a good thermal conductor, the fisherman can expect to burn his hands in a situation where a large fish may run for several hundred yards.

Figure 2:
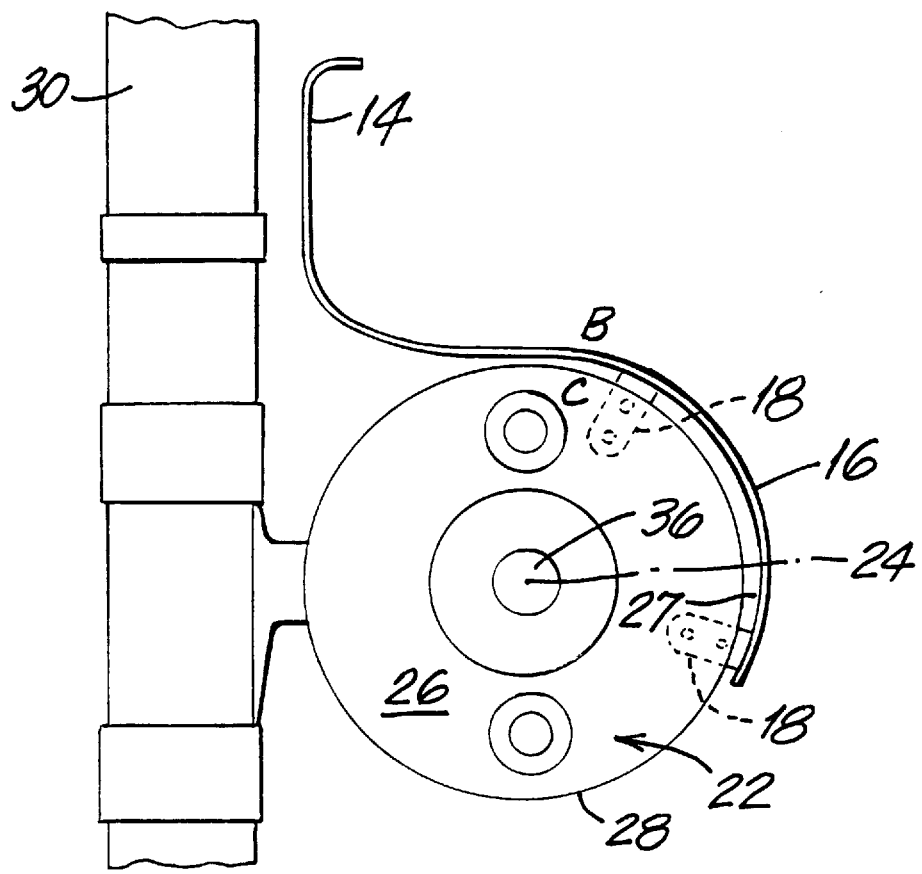
FIG. 2 is a side view of the element of FIG. 1 attached to a fishing reel and fishing pole.

Additionally, an arcuate segment as in FIG. 1 basically does not want to be bent so as to contact the rotating flange. Arches are used in structures precisely because they resist such bending.

However, where a thin plastic is used that is basically not a spring, as in the present invention, bending of the free edge 48 provides an extended surface area of contact rather than a line or spot of contact. Engagement with the outer periphery 28 of the rotating flange 26 is much easier. The plastic material may act as a weak spring, or merely may return in a short period of time to its original condition through "memory" after deformation.

As the plastic is a poor conductor of heat, the fisherman's palm is protected from burning. The flexibility of the plastic allows the fisherman to apply the braking force at many different portions of the arcuate surface and to move the location of force application during braking, thereby avoiding hot spots. Chips and particles are not generated as might occur with a metal or leather brake element. The plastic will wear faster due to friction than the outer periphery 28 of the reel and when worn, the brake 40 can be readily removed at the adhesive joint and replaced.

Another advantage in having a friction brake in accordance with the invention attached to the reel, is enhanced casting. Typically, when casting, the thumb is employed to finesse the fishing line as it goes out from the reel. A "bird's nest", i.e., multiple tangles of line on the reel from a poorly fingered cast, occurs less often and to a lesser degree when it occurs because of the presence of the brake. Because the brake can be lightly engaging the entire spool as compared to a person's thumb which only engages a part of the spool, there is better control of the outgoing line. Thus the frustration of tangled lines that occurs with standard casting reels and the need to cut the line after tangling in some instances, may be eliminated.

In an alternative embodiment, the brake 40 may be held to the fixed member 32 by screws 33, illustrated with phantom lines in FIG. 7, rivets and the like. In such constructions, because the bending of the plastic is more hinge-like than spring-like, little force is transmitted to the fixed member 32 when using the brake.

FIG. 5 illustrates an end view in cross section of a friction brake 40' in accordance with the invention. The brake 40' is the same as the brake 40 but modified by addition of arcuate notches 54, 56, which may be formed into the convex or concave surfaces of the arcuate segment 42 so as to enhance bending. The notch 54 that is close to the adhesive layer 44 will readily flex with a hinge-like action proximate the fixed member 32. Accordingly, forces of applying the brake 40' are not transmitted to the fixed member 32 and to the reel bearing.

The notch 56 near the free edge 48 allows for deflection such that an area of contact is provided with the outer periphery 28 of the rotating flange 26 rather than a line contact as in the prior art. With the use of notches, the brake's frictional surface at the free end 48 easily makes good surface contact with the rotating flange, regardless of the general contours of the outer periphery 28, which may not always be parallel to the rotating axis 24, as illustrated.

FIG. 6 is another alternative embodiment in accordance with the invention of a friction brake 40" wherein slots are cut into the material from the free edge 48 toward the fixed inner edge 46, having the adhesive layer 44, so as to form tongues 58. FIG. 6 is a top view of the friction brake 40" prior to bending the element into its arcuate contours. The brake 40" may also include arcuate notches, as in FIG. 5, that extend across the tongues 58.

In every embodiment, the brake covers approximately a quadrant of the circular reel, although its circumferential periphery need not be so limited and may extend in a range to approximately 180°. An opening (not shown) may also be provided in the friction brakes in accordance with the invention wherethrough a line 60 may pass as in the prior art embodiment of FIG. 1.

The friction brake 40" with the tongues 58 is easily shaped by application of the force 50 so that large areas of contact may be provided between the brake and the rotating reel flange 26 with little finger pressure applied.

Thus by using a thin plastic as the brake shoe and connecting the brake to a fixed portion of the reel by means of an adhesive, screws, or in any manner that allows easy deflection of the brake against the rotating flange, the shortcomings of the prior art brake are overcome.

Figure 9:
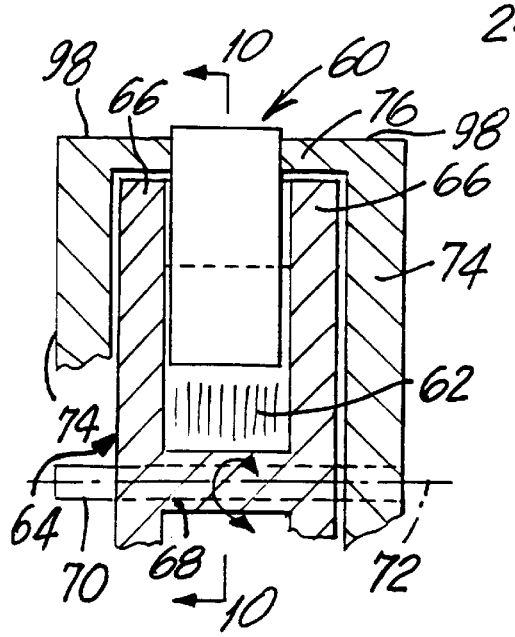
FIG. 9 is a partial end view in section of an alternative embodiment of a friction brake in accordance with the invention.
Figure 10:
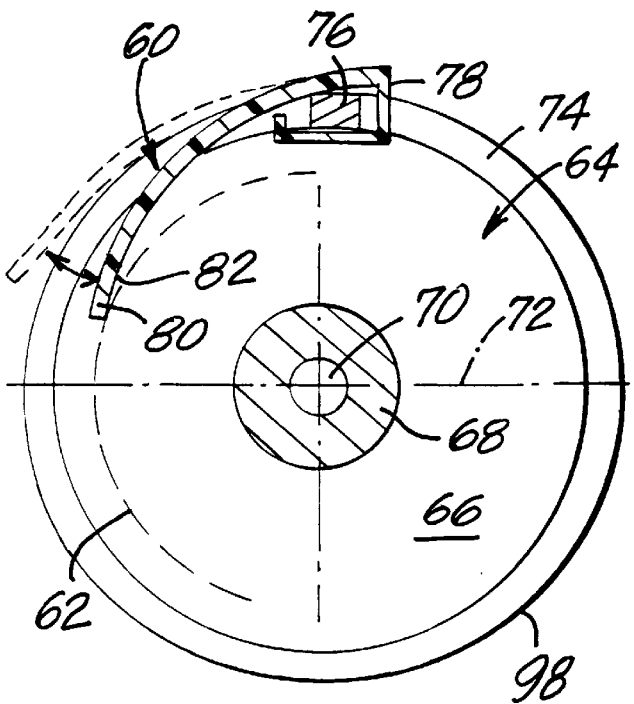
FIG. 10 is a view taken along the line 10—10 of FIG. 9.

FIGS. 9 and 10 illustrate an alternative embodiment of a strip brake 60 in accordance with the invention that is constructed to act on the fishing line 62 that is coiled on a spool 64. The spool 64 has two rotating flanges 66 which are joined to a hub 68 that rotates on a shaft 70 about an axis 72.

The spool 64 is positioned on the shaft 70 between two fixed members 74 that receive the shaft 70. A cross bar 76 extends between the fixed members 74 and may be integral therewith or integral with at least one of the fixed members 74.

The brake element 60 is of flexible plastic that has been bent and permanently deformed with generally right angles at one end 78 so as to loop around the cross bar 76 that is rectangular as illustrated, although it is not so limited. As illustrated, the brake 60 is effectively blocked from rotating about the rectangular cross bar 76 such that it deflects with cantilever action. The extended tongue 80 is easily deflected by hand or finger pressure such that the undersurface 82 of the brake 60 makes contact with the outer surface 62 of the coiled fishing line to provide braking as desired. Increased pressure on the tongue 80 provides a stronger braking action.

The brake 60 is folded at the end 78 such that when no pressure is exerted on the brake 60 it takes the position indicated with the broken lines, so that it is out of contact with the fishing line 62. Because the brake is made of flexible material it is easily "snapped" over the cross bar 76 in a prefolded condition.

Figure 11:
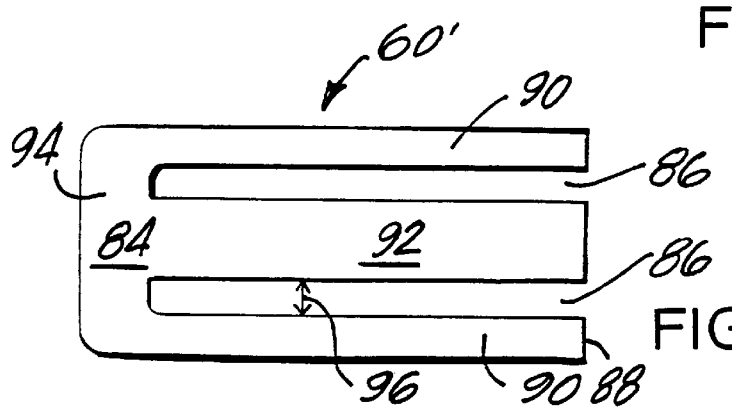
FIG. 11 is a top view of another alternative embodiment of a friction brake for a fishing reel in accordance with the invention.

In FIG. 11, a brake 60' for making contact with the fishing line includes a generally rectangular strip 84 having a pair of elongated notches 86 extending lengthwise inward from one end 88 of the strip 84. An adhesive layer (not shown) similar to that used in the embodiment of FIG. 7, is provided on one planar surface of the edge wings 90 so that these wings 90 may extend circumferentially on the circumferential surfaces 98 of both fixed members 74 of a reel construction as shown in FIGS. 9 and 10.

After such attachment, the tongue 92 of the brake 60' can be pressed against the coiled fishing line 62 as in the embodiments of FIGS. 9 and 10. However, there is no looped engagement of the brake 60' with a cross bar 76, if a cross bar is present, although such a feature may be incorporated in another embodiment (not shown) in accordance with the invention. The brake 60' may be used when it is desired to make braking contact with the fishing line 62 and no cross bar is provided between the fixed members 74.

When a cross bar is present, adhesive attachment can be made to the cross bar at the solid portion at the end 94 of the brake 60'.

The width 96 of the notches 86 allows for clearance of the tongue 92 between the rotating flanges 66 of a spool 64. The wings 90 also may be attached to the circumferential edge surfaces of the fixed members 74 using machine screws and the like in place of or in addition to the adhesive coating that has been described.

In alternative embodiments in accordance with the invention, the brake 60 of FIGS. 9 and 10 may be attached to the cross bar 76 by means of adhesive or fastening screws (not shown) and the rectangular loop illustrated in FIG. 10, may be omitted.

Also, with regard to the embodiment of FIG. 11, one of the wings 90 may be omitted. The brake 60' would then be attached to a fixed member 74 by a single wing 90 using adhesive or screws, or by attachment of the single wing 90 and the end 94 to a cross bar, again using either or both adhesive or screw fasteners. Where there is no cross member on the reel, the single wing may be attached by adhesive or screws, or both, to one fixed member 74 whereby the brake is cantilevered over the spool 64 in a construction similar to FIG. 5, except that the tongue 92 makes contact with the fishing line 62 on the spool whereas in FIG. 5, the brake makes contact with the spinning rim 28 of the rotating flange 26.

Thus, brake assemblies in accordance with the invention have been provided that act either on the moving rim of the reel or on the fishing line that is coiled on the reel.

Figure 12B:
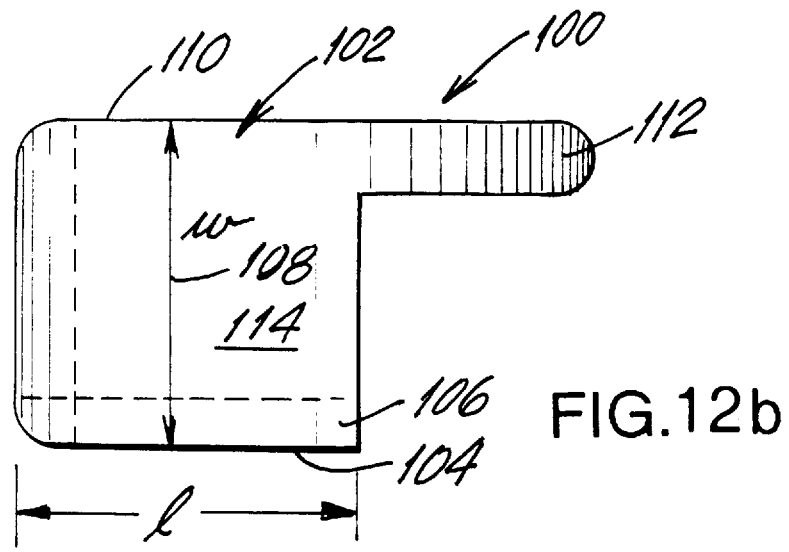
FIGS. 12a and 12b are respectively a front and top view of yet another alternative embodiment of a friction brake for a fishing reel in accordance with the invention.
Figure 12A:
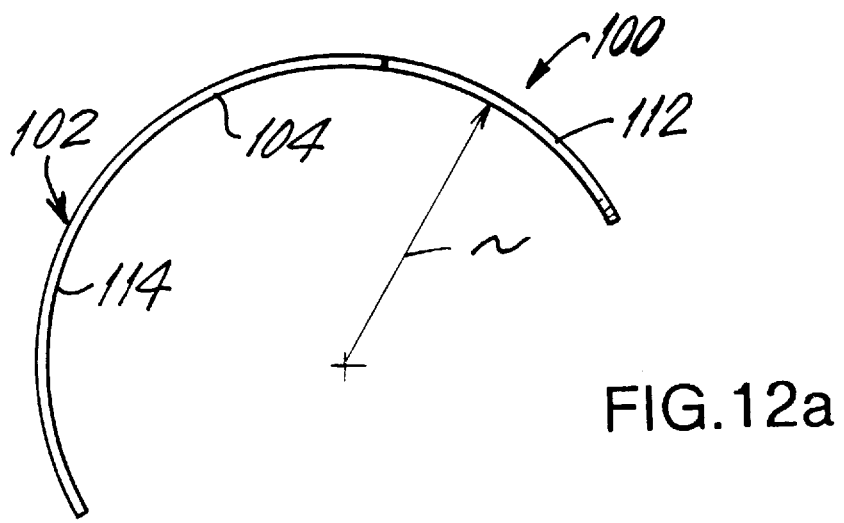

With reference to FIGS. 12a, b, a friction brake 100 comprises and arcuate strip 102 of plastic materials, as described above, having an arcuate edge 104 of length l coated with adhesive 106 on the concave side for attachment to the fixed member 32 of the fishing reel. The width w 108 of the brake 100 is such that the opposed arcuate edge 110 extends over the rotating flange 26 of the fishing reel when the friction brake 100 is attached to the reel. The brake 100 is basically similar to the brake 40 of FIGS. 3 and 4 except that a finger 112 extends (toward the right if it were illustrated in FIG. 3) from the free edge 110 in a continuation of the arc of the generally rectangular portion 114 of the brake 100. Thus, the rectangular portion 114 and the finger 112 are substantially a single arc of curvature, as best seen in FIG. 12a, which in use are applied with radius r concentrically with the rotating flange 26 of the reel.

Thus, an extended area of contact may be made with the moving flange of a reel to which the brake 100 is attached, and palm control may be exerted on the rectangular portion 114 as in the device of FIG. 4, but at the same time the operator's finger can rest on the brake finger 112 and provide fine control in braking with a slight movement of his own finger.

The finger 112 is more easily flexed than the portion 114 due to its lesser width, giving control with a lighter touch. Also, the narrow finger serves its braking function without interfering with the fish line.

In summary, the added fingertip portion substantially increases the ease with which pressure can be applied. The added fingertip portion also increases the total surface area for braking and hence necessitates less overall pressure. Because a person's fingertip can apply more force than the rest of the forefinger, an angler will have more endurance in fighting large fish such as marlin, tuna, sharks etc. The angler can modulate the pressure applied to the reel without bending his wrist backwards.

The fingertip, generally the forefinger, has greater sensitivity than the rest of the finger and palm so that minor adjustments in pressure can be very quickly made. Fish are often lost boatside when they lurch, and quick changes in brake pressure are required. Because the finger can lessen pressure very quickly, a decided advantage is gained. When pressure is not applied to the brake, the brake in accordance with the invention adds no mechanical drag to the reel. However, when a fish is on the line adjustments in pressure can be made using the extended finger much more rapidly than adjusting the mechanical drag on the reel by turning a knob that is usually provided on the reel.

In actual usage, the friction brake of FIGS. 12a, b has been most effective in reducing the time required to boat a fish. Thereby, the fish is released sooner and the fish survival rate is much greater.

It is to be understood that the following claims are intended to cover all of the generic and specific features of the invention herein described and all statements of the scope of the invention which, as a matter of language, might be said to fall therebetween.

What is claimed is:

1. A friction brake for a fishing reel having a fixed portion and a flange of radius r spaced a distance w from said fixed portion, said flange rotating when a fishing line is pulled from said fishing reel, comprising:

a thin sheet having a thickness and a first edge surface of length l for attachment to said fixed portion of said reel, and a second edge surface having a length greater than l and separated from said first edge surface by a distance of approximately w for opposing a peripheral surface of said flange when said first edge surface is attached to said fixed portion, said sheet being bendable to bring said second edge surface to contact said peripheral flange surface to provide braking of said reel, wherein said sheet is continuously arcuate with one radius of approximately r along its entire length.

2. A friction brake as in claim 1, further comprising an adhesive covering at least a portion of said first edge surface.

3. A friction brake as in claim 2, wherein said second edge surface is bendable without permanent deformation of said sheet.

4. A friction brake as in claim 1, wherein said second edge surface is brought into contact with said flange surface without permanent deformation of said sheet.

5. A friction brake as in claim 1, wherein said second edge surface includes an arc in an approximate range of 90° to 180°.

6. A friction brake as in claim 1, wherein the bendability of the sheet permits an area of contact between said sheet and said flange surface to be varied by a person.

7. A friction brake as in claim 1, wherein said thin sheet is a plastic material.

8. A friction brake as in claim 7, wherein said plastic material is one of vinyl and polyethylene.

9. A friction brake for a fishing reel having a fixed portion and a flange of radius r spaced a distance w from said fixed portion, said flange rotating when a fishing line is pulled from said fishing reel, comprising:

a thin sheet having a thickness and a first edge surface of length l for attachment to said fixed portion of said reel, and a second edge surface having a length greater than l and separated from said first edge surface by a distance of approximately w for opposing a peripheral surface of said flange when said first edge surface is attached to said fixed portion, said sheet being bendable to bring said second edge surface to contact said peripheral flange surface to provide braking of said reel, wherein said sheet is generally arcuate, said first and second edge surfaces being generally arcuate with one radius of approximately r along their respective lengths.

10. A fishing reel, comprising:

a fixed portion for connection to a fishing pole;

a flange spaced from said fixed portion and mounted for rotation about an axis when a fishing line is pulled from said fishing reel;

a thin sheet having a thickness and a first edge surface of length l for attachment to said fixed portion of said reel, and a second edge surface of a length greater than l for opposing a peripheral surface of said flange when said first edge surface is attached to said fixed portion, said sheet being bendable to bring said second edge surface to contact said peripheral flange surface, and means for attaching said thin sheet of plastic material to said fixed portion of said reel, wherein said sheet is arcuate when attached to said fixed portion and substantially concentric with said flange, said second edge surface being one continuous arc, and in using said reel fishing line comes off said reel between said thin sheet and said axis, whereby line tangling during casting due to reel overspin is controllable by applying pressure to said thin sheet along said second edge and against the flange.

11. A fishing reel as in claim 10, wherein said second edge surface is bendable without permanent deformation of said sheet.

12. A fishing reel as in claim 10, wherein said means for attachment includes one of an adhesive and a screw fastener.

13. A fishing reel as in claim 10, wherein said second edge surface includes an arc in an approximate range of 90° to 180°.

14. A fishing reel as in claim 10, wherein the bendability of the sheet permits an area of contact between said sheet and said flange surface to be varied by a person.

15. A fishing reel as in claim 10, wherein said this sheet is a plastic material.

16. A fishing reel as in claim 15, wherein said plastic material is one of vinyl and polyethylene.

* * * * *